US007671318B1

(12) United States Patent
Tener et al.

(10) Patent No.: US 7,671,318 B1
(45) Date of Patent: Mar. 2, 2010

(54) SENSOR APPARATUS AND METHOD FOR LOW-FREQUENCY SCENE SUPPRESSION AND FIXED PATTERN NOISE SUPPRESSION

(75) Inventors: Gene D. Tener, Oviedo, FL (US); Mark A. Goodnough, Santa Ynez, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 12/292,253

(22) Filed: Nov. 14, 2008

(51) Int. Cl.
*H01L 27/14* (2006.01)
*H04N 5/232* (2006.01)
*G01J 5/20* (2006.01)

(52) U.S. Cl. .................. 250/208.1; 250/332; 250/340; 250/370.08; 348/340

(58) Field of Classification Search .............. 250/208.1, 250/338.4, 330, 332, 340, 370.01, 370.08; 348/340, 345, 351
See application file for complete search history.

(56) References Cited

U.S. PATENT DOCUMENTS 5,268,576 A * 12/1993 Dudley ................. 250/332
5,629,522 A * 5/1997 Martin et al. ............ 250/338.4
6,359,681 B1   3/2002 Housand et al.
6,654,061 B2 * 11/2003 Yamada ................... 348/355
7,495,220 B2 * 2/2009 Blackwell et al. ......... 250/338.1

* cited by examiner

*Primary Examiner*—John R Lee
(74) *Attorney, Agent, or Firm*—Birch, Stewart, Kolasch & Birch, LLP

(57) ABSTRACT

An imaging circuit comprises an image detector, accumulator coupled to the image detector, a focus/defocus mechanism focusing and defocusing an optical image onto the image detector; and a controller operatively connected to the focus/defocus mechanism, wherein the controller controls the focus/defocus mechanism to focus and defocus the optical image onto the image detector to provide focused and defocused images; where the controller controls the focus/defocus mechanism to focus the optical image onto the image detector to provide charge carriers of the focused image onto the accumulator, where the accumulator accumulates the charge carriers of the focused image, the controller controls the focus/defocus mechanism to defocus the optical image onto the image detector to provide charge carriers of the defocused image onto the accumulator, where the accumulator subtracts the charge carriers of the defocused image, and the imaging circuit reads out the charge carriers from the accumulator representative of a low pass filtered version of the focused image.

23 Claims, 10 Drawing Sheets

SENSOR APPARATUS AND METHOD FOR LOW-FREQUENCY SCENE SUPPRESSION AND FIXED PATTERN NOISE SUPPRESSION

FIELD OF INVENTION

The present invention relates to improving the performance and image quality of imagers including focal plane array sensors.

BACKGROUND OF THE INVENTION

Description of Related Art

Infrared (IR) imaging and detection is used for applications like target acquisition, surveillance, homing and tracking, remote temperature sensing, spectroscopy, and weather forecasting. Objects emit infrared radiation and the temperature of an object determines how much radiation is emitted and at what particular wavelength(s).

The infrared spectrum is divided into spectral regions based primarily on how they are utilized in sensor systems. The five common regions of the infrared spectrum used include Near, Short, Medium, Long, and Very Long wavelength ranges.

The first region, the Near Infrared (NIR), covers approximately 0.7-1 microns. The second region, the Short Wavelength Infrared (SWIR), covers approximately 1-3 microns. The third region, the Medium Wavelength Infrared (MWIR), covers approximately 3-8 microns. The fourth region, the Long Wavelength Infrared (LWIR), covers approximately 8-14 microns. The last region, the Very Long Wavelength Infrared (VLWIR), covers anything beyond approximately 14 microns up to 1 mm (mm wave radar).

Infrared sensor systems are used to detect infrared radiation emitted from an object. These infrared sensor systems include IR-sensitive photo-detectors coupled with a readout integrated circuit (ROIC) for signal processing. Detectors were commonly made from silicon (Si) or germanium (Ge). Currently IR detectors are now also made from other materials such as indium antimonite (InSb) and indium arsenide (InAs). A low cost detector material, mercury cadmium telluride (HgCdTe) on Silicon or Germanium wafers, can also be selected because these devices normally have a very high 1/f noise could be more readily tolerated by applying the techniques of this invention.

The two basic types of sensors used in infrared sensor systems are "staring" and "scanning". The staring sensor is typically a rectangular Focal Point Array (FPA) that continuously images a desired field of view and looks for changes in the incoming infrared radiation over time. The scanning sensor typically uses a smaller array that scans across a range and builds up a picture of the entire desired field of view over time.

There are numerous problems associated with current IR detectors. In imaging, the image spatial power spectral densities (PSDs) are generally $1/f^\alpha$ shaped meaning most of the power is located in the lower frequencies. The current solution is to use edge enhancement filters that can suppress low-frequency scene content. Also, $3^{rd}$ Generation LWIR band noise equivalent temperature (NET) is difficult to achieve due to higher charge well requirements compared to MWIR, approximately 50 times as much.

NET is a sensitivity metric, where the lower the NET, the more sensitive the system becomes. For example, the smallest change in object temperature that is equal to the noise floor of a particular sensor, the lower the NET, thus, the more sensitive the system.

A charge well is a capacitor in the readout circuit that collects generated carriers (e.g., electrons) from the detector. Generally, a single carrier is produced for every photon that strikes the detector surface. The total amount of charge collected is proportional to the total number of photons that struck the detector during a variable time period called the integration time. The more charge that can be collected, the more sensitive the FPA becomes. The physics of Planck radiation dictate less photons/degree change for LWIR system versus an MWIR system so more photons (and therefore electrons) must be collected to achieve the same sensitivity (NET). Thus, the charge well must be larger for the LWIR system. Hot MWIR detectors require huge charge wells (approximately on the magnitude of $10^9$) to handle dark current and dark current variability between pixels. However, one problem associated with dark current generation is that the performance of detector and sensor systems degrade as the generation of dark current increases. For example, an increase in detector dark current increases the noise in the system, thus degrading the system and its performance.

The current practice is to use large capacitors in the unit cell or a switched capacitor filter to provide a large dynamic range ROIC. In using the switched capacitor filter technique, each unit-cell (i.e., circuitry associated with an individual detector element) of the array uses switched capacitor filter arrangements that include a single "cup" capacitor and at least two "bucket" capacitors. Dynamic range is improved by controlling the ratio of the current to voltage transfer resistance gains between the "cup" capacitor and each "bucket" capacitor of the filter. With an increased dynamic range, the switched capacitor filter arrangement allows the focal plane array to adequately resolve the infrared radiation received from both hot and cold objects. A comprehensive approach to this method is illustrated in U.S. Pat. No. 5,629,522, and is incorporated by reference.

Current high-dynamic range ROIC designs either skim current with a 40% noise factor or use deep well "cup in a bucket" techniques which rapidly reach a point of diminishing returns due to switching noise. U.S. Pat. No. 5,629,522 also describes a switched capacitor filter design that is also known as "cup and a bucket" (small and large charge wells).

FIG. 1 shows a conventional 2-Dimensional edge sharpening filter (2D filter) 10 which operates as follows. The conventional 2D filter 10 generates a low pass image by subjecting each of the pixels in the 480×480 pixel input image to a low pass filtering operation 5. The low pass image contains the low frequency image data and, therefore, appears somewhat blurred. The low pass filtering operation is an N×N convolution process, where in this example N=3. The value of each pixel in the input image is replaced with an average pixel value. For any given pixel in the input image, the average pixel value for that pixel is computed by summing the value of the pixel with the value of each neighboring pixel, and then dividing the sum by the number of pixels used to derive the sum. For all pixels not located on the outer edge of the input image, each summing operation should involve 9 pixels; the one pixel for which the averaging operation is being performed plus 8 neighboring pixels. This averaging operation is repeated for each and every pixel value in the input image.

The conventional 2D filter 10 also generates a high pass image by subtracting each pixel value in the low pass image from each pixel value in the input image. The subtraction operation is represented by adder 11. The high pass image generated as a result of this subtraction operation contains the high frequency image data from the input image.

In addition, the conventional 2D filter 10 generates an image contrast measure 15. The contrast measure 15 is generated by first computing the difference between adjacent pixels values along each row of the input image. The contrast measure 15 is then derived by summing all of the difference values. For example, an all white or an all black input image (i.e., an input image containing almost exclusively low frequency components) will yield a very low contrast measure. Note, there is always some noise content (typically high frequency noise). However, an input image that reflects a checkerboard pattern, wherein every other pixel is alternately black and white (i.e., an input image containing a large high frequency content) will result in a very large contrast measure.

The conventional 2D filter 10 then adjusts the gain level $G_L$ of the low pass image 20 relative to the gain level $G_H$ of the high pass image 25, or vice versa. Input images with a low contrast measure typically exhibit a relatively low signal-to-noise ratio (SNR). In order to prevent excess noise enhancement, the ratio $G_H/G_L$ will be decreased. This has the effect of reducing noise gain. The adjusted gain levels $G_H$ and $G_L$ are then applied to each pixel in the low pass image and the high pass image respectively. Input images with a high contrast measure typically exhibit a higher SNR. To further enhance the image quality, the ratio $G_H/G_L$ is increased. This has the effect of further enhancing the high frequency signals already present in the input image. Again, the adjusted gain levels $G_H$ and $G_L$ are then applied to each pixel in the low pass image and each pixel in the high pass image respectively. For input images that have a contrast measure somewhere between the very low and very high contrast measure extremes, the adjustment of the ratio $G_H/G_L$ is based upon a polynomial curve that establishes the relationship between contrast measure and gain level. In a preferred embodiment of the present invention, the polynomial curve used for adjusting the ratio $G_H/G_L$ is implemented through a look-up table. However, one skilled in the art will readily understand that the polynomial curve could easily be implemented through an equation.

The conventional 2D filter then produces an enhanced image by adding each pixel in the now adjusted low pass image with a corresponding pixel in the now adjusted high pass image. The adding operation is represented by adder 13.

FIG. 2 is a simplified representation of the conventional 2D filter 10 as shown in FIG. 1. The gain amplifier 20 with gain level $G_L$ 20 and the gain amplifier 25 with gain level $G_H$ are numerically shown as a single gain amplifier block 30 having a single gain factor difference (a) between the high-pass and the low-pass filtered data.

FIG. 3 is a conventional FPA-type detector. The FPA-type detector typically comprises an extrinsic or intrinsic detector array 172. This detector array may be made of a wide range of materials, including GaAs (gallium-arsenide) and InSb (indium-antimonide). The detector array may be a continuous layer of material, or it may be composed of pixels of the detector material, with each pixel on the detector array corresponding to one pixel of image resolution. A 800×600 detector array, therefore, has 480,000 pixels and can produce an image of up to 800×600 screen resolution. Each pixel in the array is a 'collection hole' that absorbs incident photons and produces an electric charge relative to the amount and intensity of the photons absorbed.

SUMMARY OF THE INVENTION

The present invention seeks to solve the aforementioned problems with a system and method for improving performance and image quality of staring and scanner-based detectors (preferably MWIR & LWIR detectors such as $3^{rd}$ generation devices, but can also be used with other detectors spanning the electromagnetic spectrum (including UV to radar), and particularly LWIR FPAs, FPAs operating at higher operating temperatures, and FPAs with high 1/f noise).

Staring LWIR detectors such as 3rd Generation devices, FPAs operating at higher operating temperatures, FPAs with high 1/f noise, and any charge integrating detector requiring large charge storage capacity will benefit from this invention. In addition, very small unit cell staring FPAs have very little room for capacitance storage will benefit. Further, a large charge capacity increases the proportion of ROIC noise when observing very low background levels (i.e., low temperature scenes) that are common in large dynamic range systems, where this invention allows lower readout noise and increased sensitivity in these situations.

Charge capacity on the order of $1\times10^6$ to $1\times10^7$ charge carriers (e.g., electrons) represents the current state of the art for small unit cells while several orders of magnitude higher capacity improves SNR and may be absolutely necessary to make higher temperature FPAs with large dark current levels viable. Variations in responsivity, dark current, and 1/f noise between detectors in an FPA can create severe fixed pattern noise that consumes many bits of an A/D converter. These carriers can be either added or taken away from an integration capacitor (e.g., charge well). Detectors of both polarities exist, where either the capacitor starts out filled and electrons are removed or empty and electrons are added. In either instance, the equivalent number of "carriers" collected is the total change in electrons stored during the integration time.

This invention reduces the charge capacity limitation by orders of magnitude while virtually eliminating the fixed pattern noise. In addition, this invention produces edge enhanced object plane information while suppressing image plane fixed pattern noise (FPN) information.

This invention improves performance using a unique combination of optic focus adjustments, ROIC design, and image processing techniques that expand the dynamic range of an ROIC, suppress FPN, and enhance high-frequency scene detail. The dynamic range of IR sensor systems is improved by suppressing low-frequency scene content at the detector site enabling longer integration time and thus providing a higher SNR. Another benefit of the present invention is it enables higher gain in the ROIC with the ability to use a smaller capacitor/charge capacity, enhances high-frequency scene detail, and suppression of dark current and FPN. The invention provides a benefit including being an enabler for Hot MWIR high-flux FPAs.

By slightly defocusing the optics, this invention produces a low-frequency component optically instead of using the convolution filter shown in FIGS. 1 and 2. A high-frequency component is provided by focusing the optics and subtracting the low-frequency (defocused image) information from the focused image.

Another way this invention improves performance is providing a huge dynamic range compression. A huge dynamic range compression achieved by subtracting the defocused low-frequency charge from the focused high-frequency charge. During the subtraction process, the high-frequency FPN is removed, thus providing only the high-frequency scene content. This FPN removal process enables use of FPA technologies that have very high FPN or 1/f noise, enabling the use of FPAs having high dark current or high dark current variability between pixels.

Optical defocus is used to establish the low-frequency signal content prior to the detector compared to the signal processing technique that operates after the detector has sensed the image using a convolution filter on signal and noise. In the inventive technique, the low-frequency scene content, dark current, 1/f noise, and fixed pattern noise differences from pixel to pixel are suppressed in the ROIC providing more charge capacity and dynamic range at the A/D converters for the more important high-frequency signal content. The approach of the conventional art would not address the charge well limitations if used with a conventional readout Unit Cell and an external processor.

The proposed invention significantly extends dynamic range, requires smaller capacitors in the unit cell, provides object space edge enhancement while suppressing high-frequency FPN, and does not waste dynamic range due to fixed pattern noise sources including gain variations, dark current variations, 1/f noise, and DC IR pedestal.

DETAILED DESCRIPTION OF INVENTION

Figure 1:
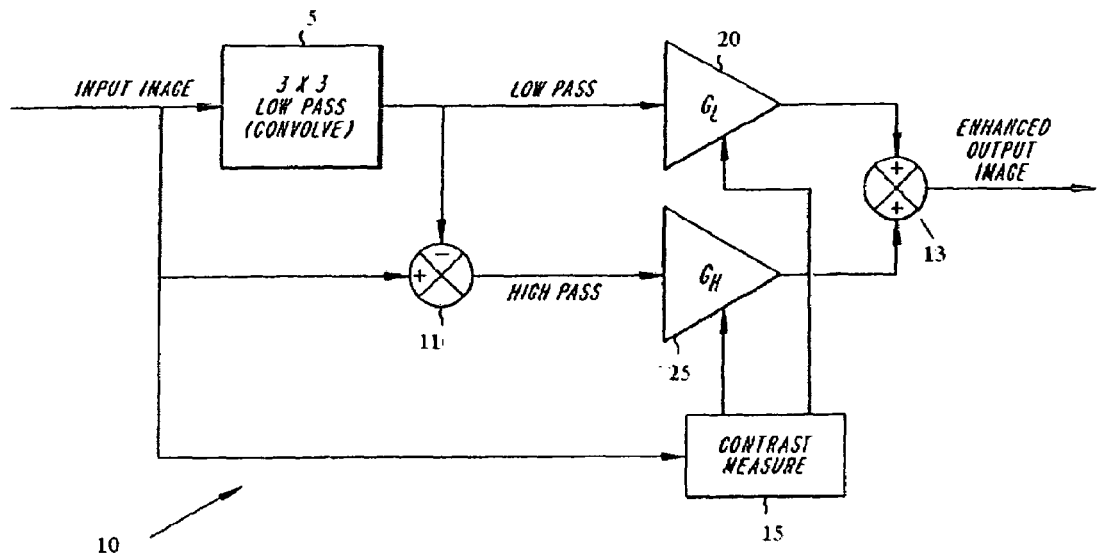
FIG. 1 is a circuit diagram of a conventional 2D sharpening filter.
Figure 2:
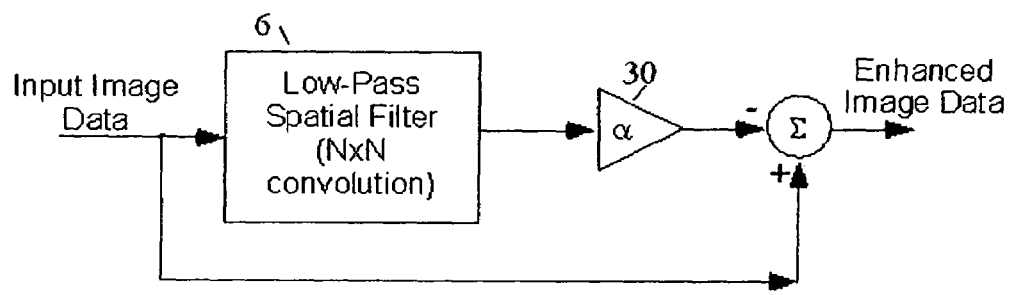
FIG. 2 is a simplified circuit diagram of the conventional 2D sharpening filter of FIG. 1.
Figure 3:
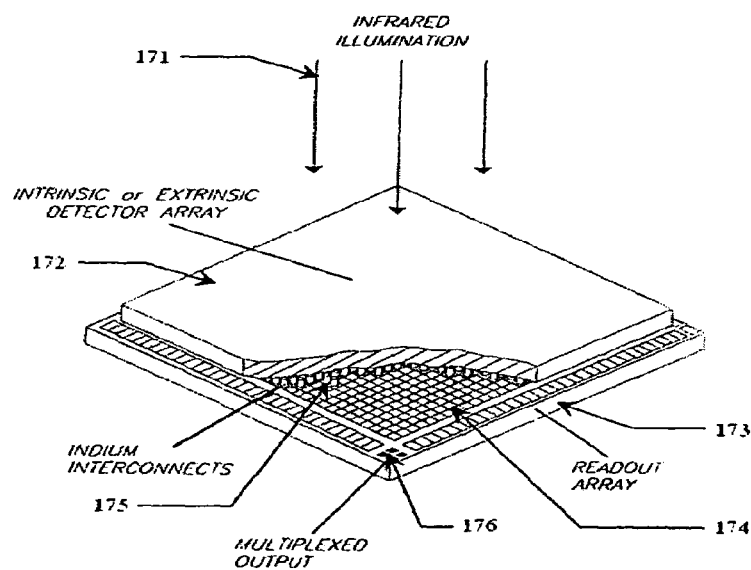
FIG. 3 is a conventional FPA-type detector.

The invention being described may be varied in many ways. Such variations are not to be regarded as departure from the spirit and scope of the invention, and all such modifications are intended to be included within the scope of the following claims. Further, this invention can be applied to most systems, methods, and programs for example, systems, methods, and programs involving imaging, detection, and/or reconnaissance and targeting. Also, referring specifically to the figures, identical or similar parts are designated by the same reference numerals throughout this disclosure and therefore discussion of the same reference numerals will likely be only discussed in the first reference to that part. Thus, identical or similar parts are designated by the same reference numerals are assumed to be equivalent unless specified.

In order for improving performance aspects of the invention provides the use of a unique combination of optics focus adjustments, ROIC design, and/or image processing techniques.

Aspects of the invention produce a low-frequency component optically by slightly defocusing the optics or otherwise creating a defocused image. High frequency information is produced by focusing the optics and subtracting the low-frequency (defocused image) information from the focused image.

Performing this function optically and using an ROIC provides some powerful capabilities. Specifically, huge dynamic range compression is achieved when subtracting the defocused low-frequency charge from the focused high-frequency charge. In addition, the high-frequency FPN is removed during the subtraction process, so only the high-frequency scene content remains. The FPN removal process enables use of FPA technologies that have very high FPN or 1/f noise. FPAs that have high dark current or high dark current variability between pixels now become viable options. Similarly, the integration time, and therefore SNR, can be significantly improved for staring LWIR FPAs that are charge well limited.

Figure 4:
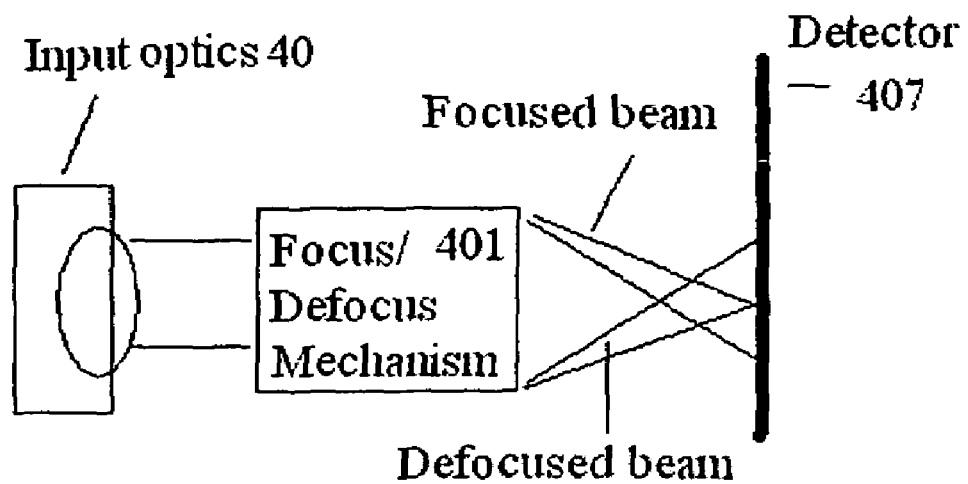
FIG. 4 is a diagram of one aspect of a front end of a FPA system according to aspects of the invention.

FIG. 4 illustrates one example of a front end of a FPA system according to the invention, where the front end may include input optics 40 optically coupled to a focus/defocus mechanism 401. The focus/defocus mechanism 401 may be connected to and controlled by a controller (not shown in FIG. 4). The optical image from input optics 40 and focus/defocus mechanism 401 is focused/defocused onto an image detector 407.

Input optics 40 may be comprised of conventional optical components such as lens(es) and filters the purpose of which is to gather an optical image and relay it to the focus/defocus mechanism 401. Also, the input optics 40 is optional depending on the design of the focus/defocus mechanism 401. For example, the focus/defocus mechanism 401 may include optical elements capable of providing an optical image to a detector which would make the input optics unnecessary.

The image detector 407 used in all aspects of the present invention is not limited to any certain type of detector. For example, the image detector 407 may be any type of photon detector(s), intrinsic type detector(s), extrinsic type detector(s), free carrier type detector(s), a quantum (quantum well) detector(s), photodiode(s), thermal detector(s), photomultiplier(s), and/or charge-coupled device (CCD) detector(s). Also, types of the detectors may include photoconductive, capacitance, photoemissive, photoconductive, photon-drag, and photovoltaic. Further, the image detector 407 may be any detector using Si, Ge, PbS, PbSe, InSb, HgCdTe, InAs, InGaAsSb, InAsSbP, InGaAs, extended InGaAs, $Al_2O_3$, $CaF_2$, Kbr, and/or KCl; or a combination of the above (e.g., InSb/InAs) may be used.

Further, depending on the type of detector used (i.e., HgCdTe), the temperature of the detector and the system need to be reduced and/or stabilized. Detectors need cooling to improve their signal-to-noise ratio to a level at which they have a stable signal response. Temperature range of the system is maintained either with cooling agents, such as liquid nitrogen or helium (in a container called a Dewar). Thus, a Dewar is used in a FPA system to enclose the detector for cooling purposes.

Figure 5:
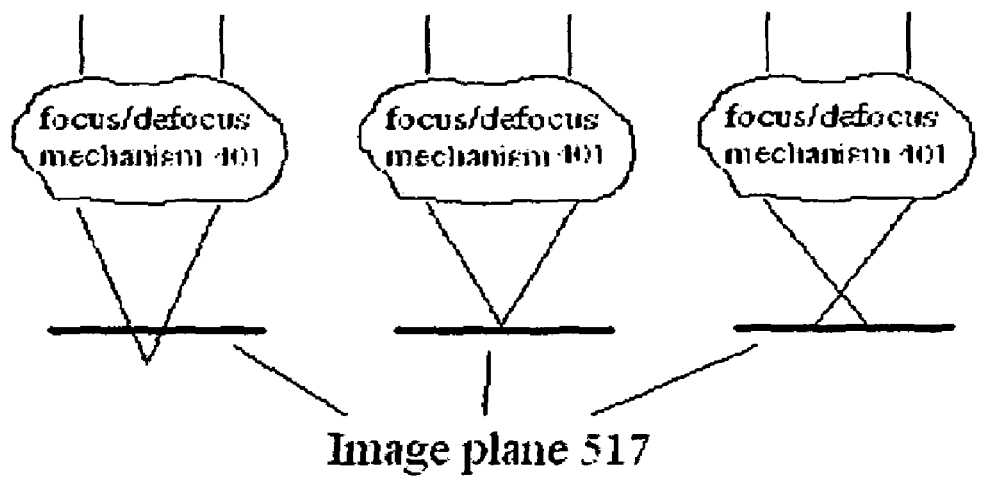
FIG. 5 illustrates examples of a focus/defocus mechanism focusing and defocusing according to aspects of the invention.

The focusing/defocusing of the focus/defocus mechanism 401 is illustrated in FIG. 5 where the image is focused and defocused onto the image plane 517 (i.e., detector 407) by the focus/defocus mechanism 401. Defocus (and focus) can be achieved in numerous ways. For example, focusing/defocusing may be achieved by inserting and removing an optical flat using an optical Chopper to shift focus. When the optical flat is inserted between (inserted in the line of sight) a focus mechanism (e.g., the focus/defocus mechanism 401) and an image plane (e.g., the image plane 517), the focus mechanism is in defocus thus obtaining a defocused image. When the optical flat removed from between (removed from the line of sight) the focus mechanism and the image plane, the focus mechanism is in focus thus obtaining a focused image. Another example of achieving focusing and defocusing is preformed by a shifting of optics, whereby moving an optical lens in the line of sight (axis of incident light) towards and away from the image plane in order for a focus mechanism to focus and defocus, thus obtaining focused and defocused images. FIGS. 6-11 illustrate examples of achieving focus/defocus using different focus/defocus mechanisms.

Figure 6:
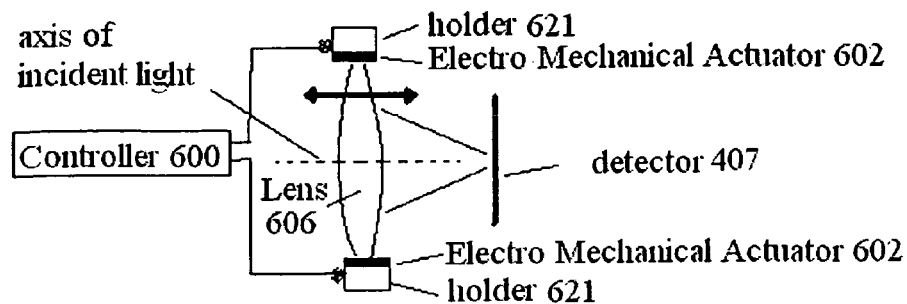
FIG. 6 illustrates an example of a focus/defocus mechanism according to aspects of the invention.

The system of FIG. 6 is designed to change an intensity or power level of an input optical beam in a controlled manner to produce an output optical beam with different attenuated intensities by moving the lens away from and towards the position of best focus. The system of FIG. 6 is designed by using a lens 606 and a holder 621. The lens 606 transfers the incident light beam from a focus/defocus mechanism 401 to the detector 407. The position of lens 606 is controlled by controller 600 where the lens 606 is moved or displaced along the axis of the incident light. The holder 621 may comprise an electro mechanical actuator 702 (e.g., a piezoelectric actuator, stepper motor). The holder 621 may be a single holder where, for example, the holder is placed around the circumference of the edge of the lens 606 or the holder 621 may comprise multiple holders placed at different locations on the edges of the lens 606.

The controller 600 controls the movement or displacement of the lens 606 by applying (i.e., transmitting) an electrical signal (i.e., control signal) to the electro mechanical actuator 602 (e.g., piezoelectric material). For example, when an electrical signal is applied to piezoelectric material, the piezoelectric material is moved or displaced accordingly.

Piezoelectric material or elements are beneficial for their ability to rapidly move a large mass (i.e., lens(es), detector(s), Dewar) over microscopic distances to accurately align the large mass with another object and optimize the system's measurements or outputs (i.e., detecting and/or scanning).

A stepper motor (or a reluctance motor) may also be used as the electro mechanical actuator 702. Stepper motors have multiple tooth shaped electromagnets that are arranged around a centralized gear coupled to a motor shaft that allow the motor to be slightly rotated in precise rotations. A controller (i.e., controller 600, 700) powers the electromagnets to turn the motor shaft. The motor shaft is turned by giving power to a first electromagnet so that the teeth of the gear magnetically attracted (and thus aligned) to the teeth of the electromagnet so that the teeth of the gear is slightly misaligned or offset from the teeth of the adjacent teeth. Thus, the motor shaft is turned again by giving power to a second or adjacent electromagnet (turned on) while the power to the first electromagnet is turned off or stopped. This method is repeated in either a clockwise or counterclockwise fashion so that the gear (and thus motor shaft) rotates slightly ("steps") in the clockwise or counterclockwise direction.

Figure 7:
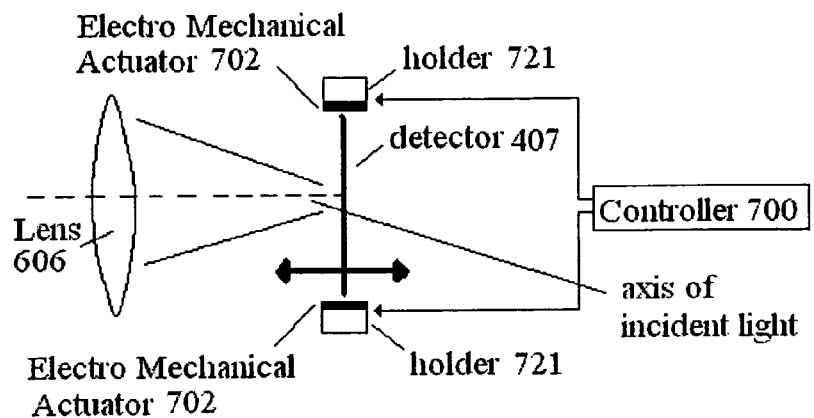
FIG. 7 illustrates another example of a focus/defocus mechanism according to aspects of the invention.

In FIG. 7, the detector's position is controlled by controller 700 where the detector 407 is moved or displaced (along the axis of the incident light). The holder 721 of FIG. 7 is similar to the holder 621 of FIG. 6. Thus, the controller 700 controls the movement or displacement of the detector 407 by applying an electrical signal on electro mechanical actuator 702 (i.e., piezoelectric material). Further, as discussed above in reference to the lens holder 621, the detector holder 721 may be a single holder coupled to the detector 407 or may comprise multiple holders placed at different sides of the detector 407.

Figure 8:
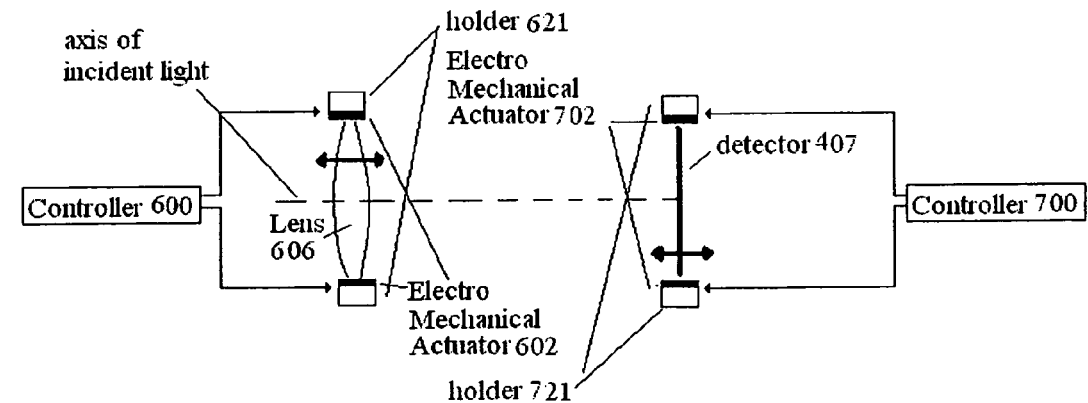
FIG. 8 illustrates another example of a focus/defocus mechanism according to aspects of the invention.

FIG. 8 illustrates a similar device according to FIGS. 6 and 7, where both the lens position and the detector position are controlled by controller 600 and 700 where the detector 407 and the lens 606 are moved or displaced (along the axis of the incident light). The holders 621 and 721 of FIG. 8 are similar to the holders 621 and 721 of FIGS. 6 and 7, respectively. In this Figure, controllers 600 and 700 may be separate controllers or the controller 600 controlling the lens 606 and the controller 700 controlling the detector 407 are the same controller.

Figure 9:
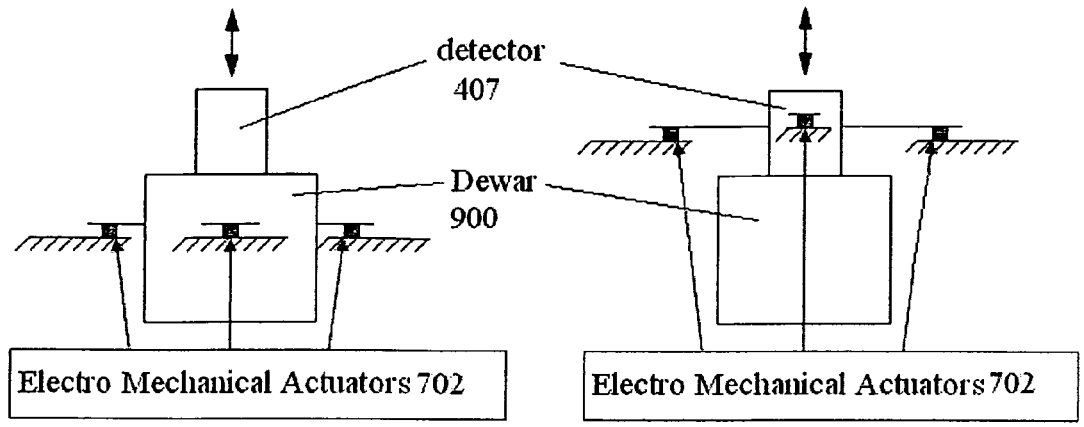
FIG. 9 illustrates another example of a focus/defocus mechanism according to aspects of the invention.

As shown in FIG. 9, a plurality of electro mechanical (i.e., piezoelectric) actuators 702 are coupled to a Dewar 900 in order to move detector 407 towards and away from a focus/defocus mechanism 401 and/or a variable optical attenuator (not shown in FIG. 9). The electro mechanical actuators 702 may be coupled to the detector 407 in numerous ways, for example, only one actuator may be used or a plurality of actuators (i.e., two actuators, located on adjacent sides) may be used. Further, the locations of the electro mechanical actuators 702 are not limited to the side or sides of the Dewar 900, the electro mechanical actuators 702 may also be designed above and/or below the Dewar 900. Lastly, the actuators may instead (or in addition to) be connected to the detector 407, where a single actuator is used or multiple actuators (i.e., two actuators, located on adjacent sides) may be used at different sides (including any or all sides) or a single or multiple actuator used above and/or below the detector 407.

Figure 10:
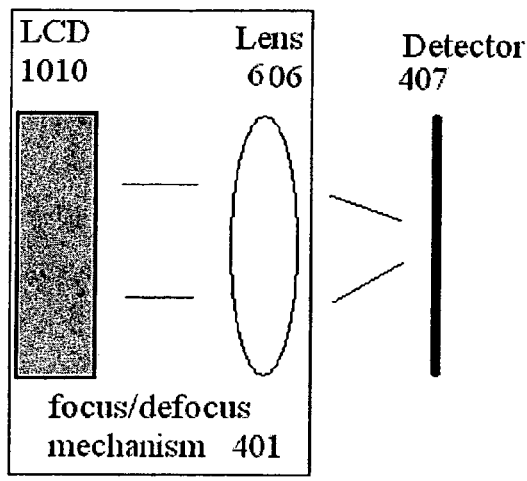
FIG. 10 illustrates another example of a focus/defocus mechanism according to aspects of the invention.

Another example of focusing and defocusing is performed by restricting or apodizing the aperture by using an LCD device 1010 as shown in FIG. 10. By using an LCD device 1010 with a full aperture, the aperture is unrestricted. The full aperture provides a defocused image and by using the LCD device 1010 to restrict an aperture, the restricted aperture provides a focused image. However, the LCD device 1010 may be designed so that the full aperture provides a focused image and the restricted aperture provides a defocused image.

Figure 11:
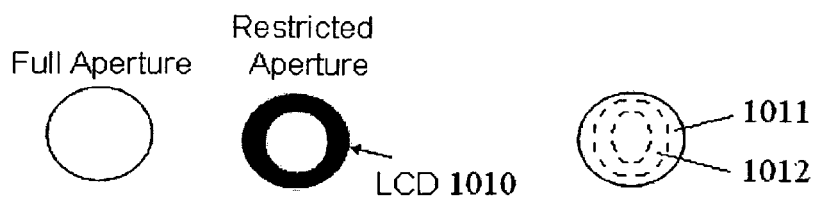
FIG. 11 further illustrates details of the focus/defocus mechanism according to FIG. 10.

The LCD device 1010 acts as an aperture stop, where the LCD is the element that determines the amount of light reaching the image detector 407. The LCD device 1010 used may comprise an individual LCD (i.e., a transparent type LCD or similar type of device) or plurality of individual LCDs each forming an annular, disk, or ring shape 1011 as illustrated in FIG. 11. When the LCD device 1010 is controlled by a controller (not shown in FIG. 11) to provide a clear (or white) transmitting state to allow light to pass through (first mode) and to provide a dark (or black) transmitting state where a majority (substantially all) or all light is diffused (second mode). The second mode may be preformed by an absence of an electric signal-applied Power. The first mode may be activated by a controller providing an electric signal (i.e., a control signal) to the LCD. Furthermore, the mode may also work in reverse where the first mode may be preformed by an absence of an electric signal and the second mode may be activated by a controller providing an electric signal (i.e., a control signal) to the LCD.

LCD device 1010 forms a single (outer) annular, disk, or ring shape 1011 as illustrated in FIG. 11. The LCD device may also adjust the single annular, disk, or ring shape 1011 by adjusting the diameter of the outer annular shape. However, the LCD device 1010 may also comprise an individual LCD or a plurality of individual LCDs forming a plurality of annular, disk, or ring shapes 1011 and 1012 as illustrated in FIG. 11. The plurality of annular, disk, or ring shapes (i.e., 1011 and 1012) provide multiple degrees of defocus (and focus), thus, providing multiple apertures. Further, the LCD device 1010 may have more than two annular, disk, or ring shapes (i.e., 1011 and 1012), the LCD device 1010 may have three or more annular, disk, or ring shapes depending on the application.

FIG. 11 illustrates an example of how circular aperture is achieved by the LCD device 1010. However, the LCD device 1010 may also produce any pattern, including a SINC function, thereby creating a spread function at any location. For example, a SINC function at an aperture will provide a rectangular function (rectangle function, RECT function, unit pulse, or normalized boxcar function) in the image plane. Thus, the circular aperture will create an airy disk pattern at the image plane and the restricted circular aperture will create a larger airy pattern.

Furthermore, the LCD device 1010 may be used in conjunction with the systems as set forth in FIGS. 6, 7, and/or 8. Additionally, a controller controlling the LCD device 1010 may also be the same controller controlling the detector 407 and/or lens 606 or a separate controller.

The LCD device 1010 may be substituted by a like aperture stop device. For example, an aperture stop device may be an element placed in the path either between the lens 606 and the detector 407 (the aperture stop device is placed after the lens) or the lens 606 is placed between the aperture stop device and the detector 407 (the aperture stop device placed before the lens). A controller controls this type of aperture stop device by restricting and unrestricting the aperture of the aperture stop device. An aperture stop device may also be coupled around the rim of the lens to restrict the diameter of the light that can enter and pass through the lens.

Figure 12:
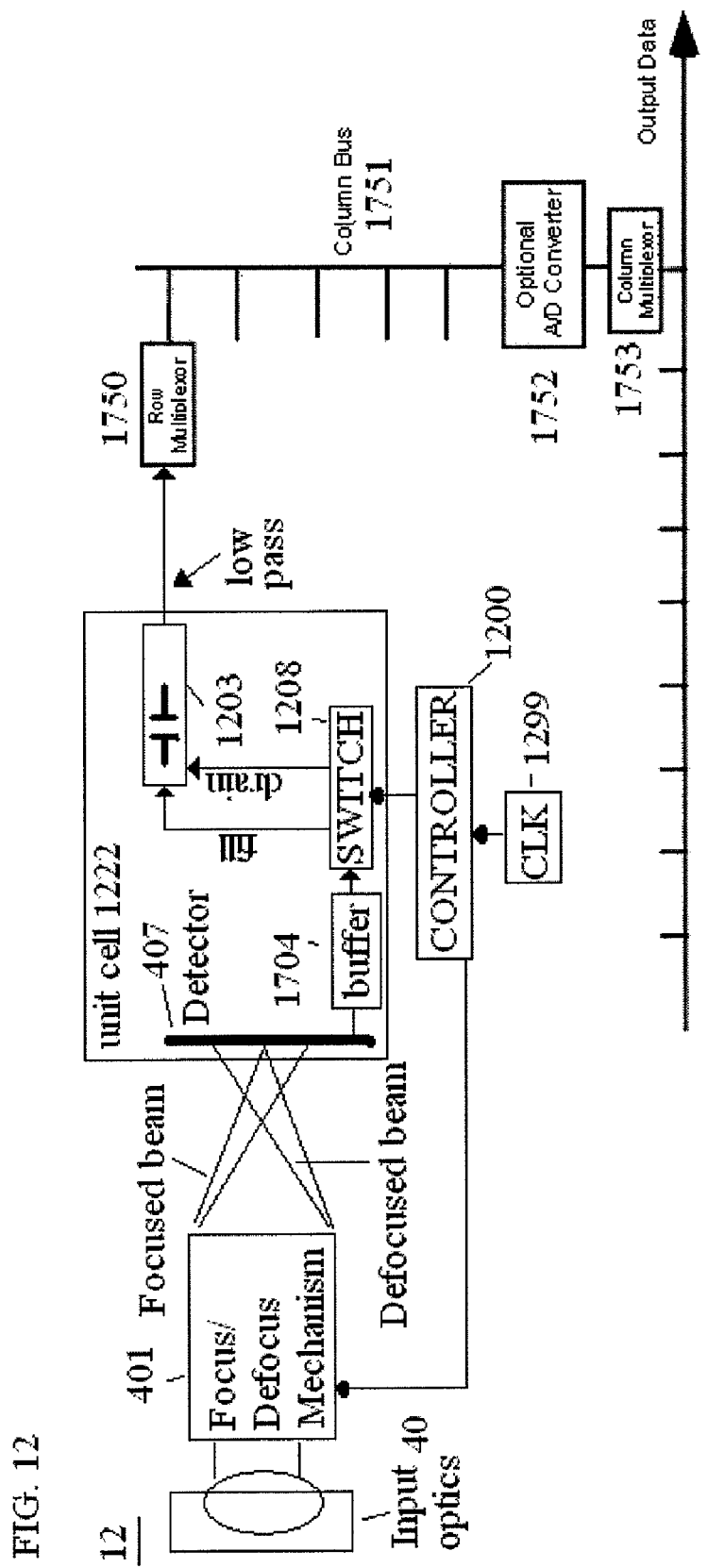
FIG. 12 is a circuit diagram of a FPA system according to aspects of the invention.

FIG. 12 is a high level block diagram illustrating an embodiment of the invention. As shown therein, an image processing system 12 may include input optics 40 optically coupled to a focus/defocus mechanism 401.

The focus/defocus mechanism 401 is connected to and controlled by a controller 1200. The optical image from input optics 40 (optional) and focus/defocus mechanism 401 is focused/defocused onto an image detector 407. As discussed above, defocus may be achieved in numerous ways.

Controller 1200 may be constructed using a variety of known technologies such as a digital signal processor (DSP), application specific integrated circuit (ASIC), field programmable gate array (FPGA) special purpose electronic circuit, or it may comprise a general-purpose computer selectively activated or reconfigured by a computer program stored or encoded in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of computer readable media suitable for storing electronic instructions.

In the unit cell 1222, the buffer 1704 reads out the image to switch 1208 from detector 407. The buffer 1704 maintains detector bias and conducts all generated detector current to its output for collection on an integration capacitor 1203. The switch 1208 is controlled by the controller 1200 to input the buffered signal to an integration capacitor 1203 (also may be a collector or an accumulator for the incoming signal) as will be described in more detail below in relation to FIGS. 13, 14, 15, and 16. The integration capacitor 1203, being in this example an accumulator, includes a fill input port and a drain input port which the switch 1208 drives in order to integrate the signal on the integration capacitor 1203.

The fill input port receives a focused image from the buffer 1704 via a switch 1208 and the drain input port receives a defocused image from the buffer 1704 via a switch 1208. Thus, charging the integration capacitor 1203 while focusing and discharging the integration capacitor 1203 while defocusing. By using the focused/defocused images with the fill/drain ports of the integration capacitor 1203, the system has a low-pass version of the image. However, the system may also be designed where the fill input port receives a defocused image and the drain input port receives a focused image.

An approach for achieving a gain difference between the low-pass (output of integration capacitor 1203) and original image data is varying the ratio of integration time of capacitor 1203 during blurred mode integration to DC (see FIG. 15) and non-blurred mode ($\tau_{Fn}$). Thus, by adjusting the integration times for $\tau_{Fn}$ and $\tau_{DC}$, the gain ratio is adjusted.

The controller 1200 controls focus/defocus mechanism 401 and the switch 1208. However, the switch 1208 is optional where the controller 1200 may control the buffer 1704 directly to feed the images to the integration capacitor 1203. Thus, the controller 1200 may charge the capacitor 1203 while in focus and discharge the capacitor 1203 while in defocus.

The integration capacitor 1203 may be contained within the sensor readout integrated circuit (ROIC), just below the detector material. The integration capacitor 1203 is one component of many within the unit cell (i.e., all of the circuitry is associated with a single pixel). The unit cell is generally the same size as the detector pixel and is directly behind each detector pixel. Thus, a staring array has a matrix of these unit cells to match the matrix of detector pixels above the readout. There are also monolithic-type detector approaches where the detector is one of the components within a unit cell.

Figure 13:
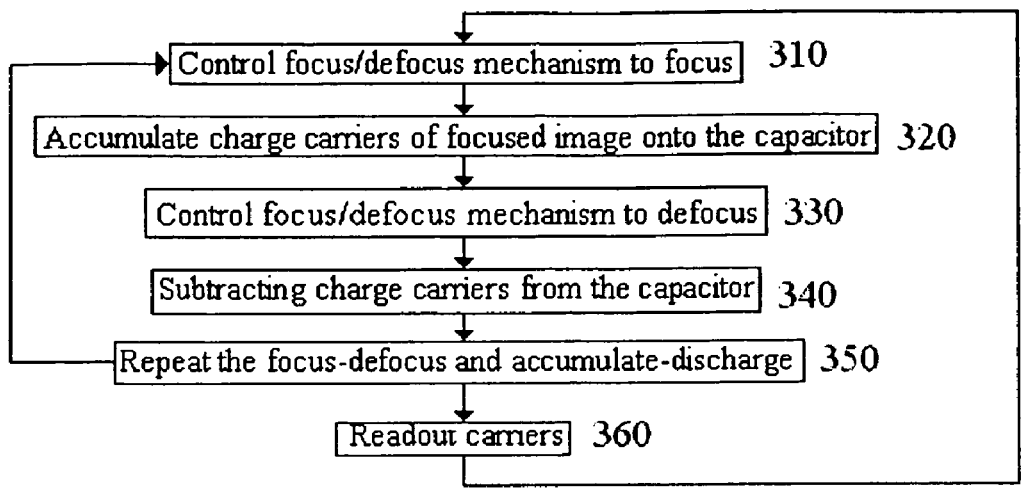
FIG. 13 is a flow chart representing a first control method that may be executed by a controller according to aspects of the invention.
Figure 14:
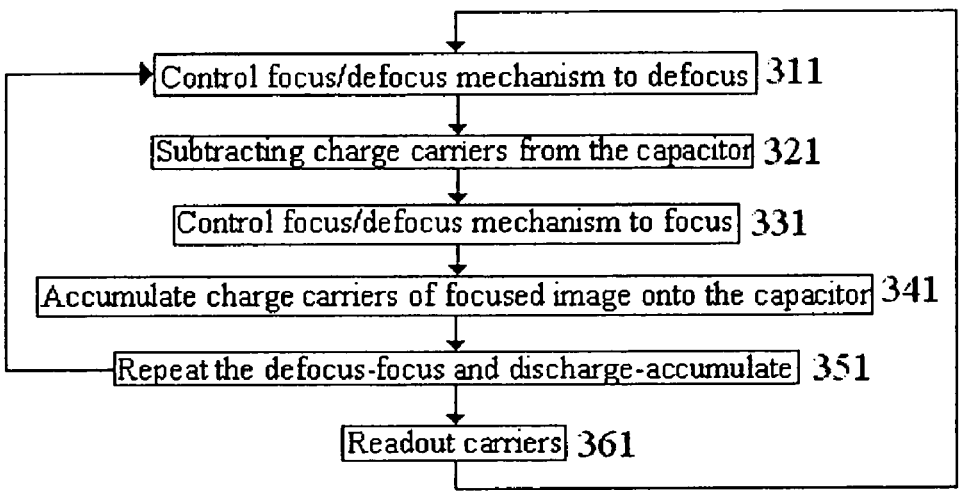
FIG. 14 is a flow chart representing a second control method that may be executed by a controller according to aspects of the invention.

As discussed above, the low-pass filter is achieved by optics defocus. Rapid cycling between focused and non-focused images within a single frame time primarily allows high spatial frequency content on the integration capacitor 1203. The integration capacitor 1203 is charged while focused and discharged while defocused. FIGS. 13 and 14 are flow charts representing a first and second control method that may be executed by controller 1200 in charging the integration capacitor 1203. FIG. 13 is one general implementation that begins with no charge on the capacitor and accumulates charge from the detector. FIG. 14 is a second general implementation that begins with a known charge on the capacitor and uses the detector current to subtract charge.

Figure 15:
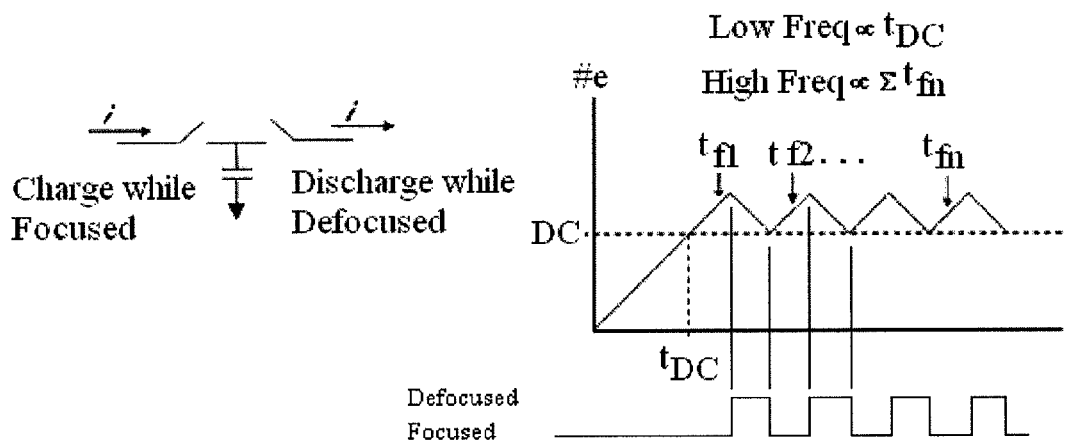
FIG. 15 is the graph of the charging and discharging of the integration capacitor according to aspects of the invention as shown in FIG. 13.
Figure 16:
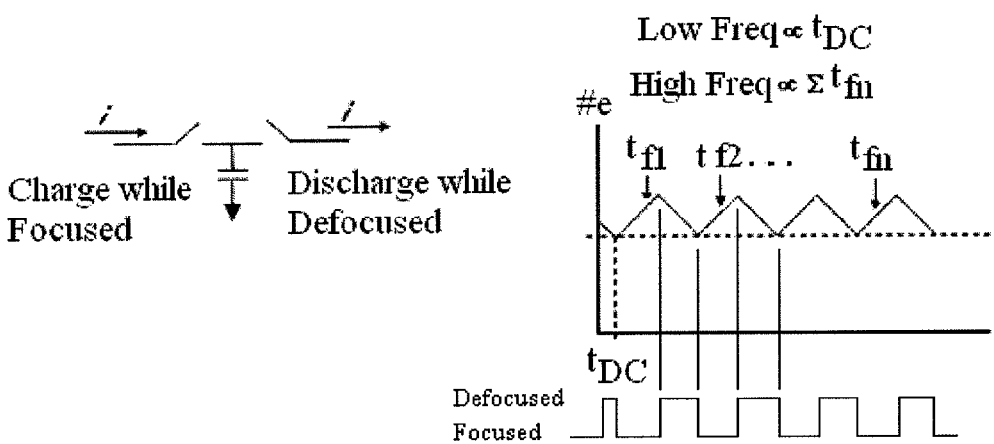
FIG. 16 is the graph of the charging and discharging of the integration capacitor according to aspects of the invention as shown in FIG. 14.
Figure 17:
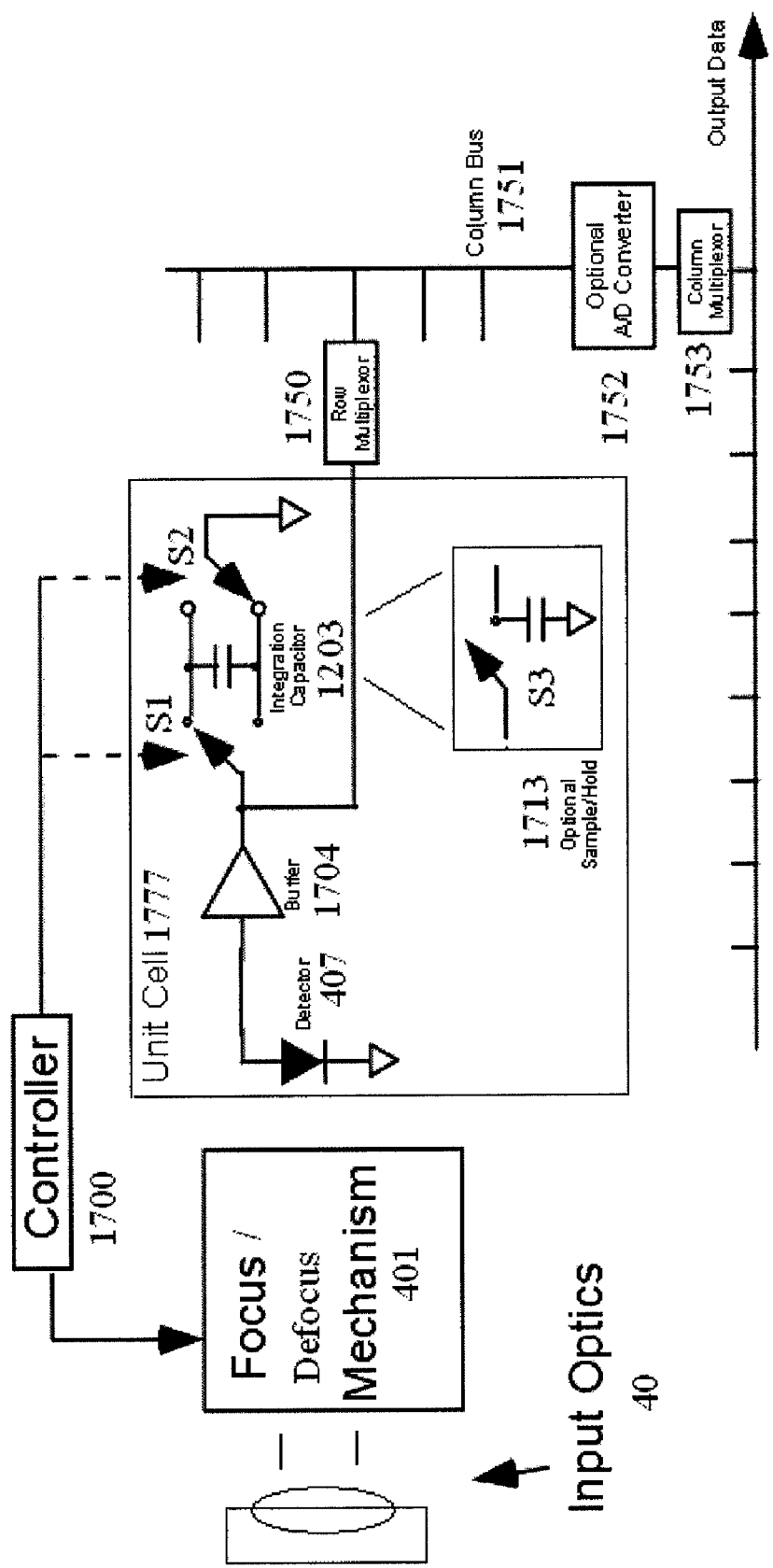
FIG. 17 is a circuit diagram showing an embodiment of one possible implementation of the invention.

FIG. 12, along with FIG. 17, include unit cells. In each unit cell, an incident photon creates a charge in a pixel in the detector 407. This charge is integrated in the integration capacitor 1203 over a set period of time (as shown in FIGS. 15 and 16) when a controller has switched switch/switches to a position during non-blurred imaging which is occurring during the period of charging. The switch/switches are switched by the controller to the position during blurred imaging which is occurring during the period of discharging.

As may be applied to all outputs of the unit cells of the present invention, the integration capacitors 1203 of all pixels in a given row are fed into a column bus 1751 when a multiplexer 1750 switch is closed, and the column buses are then further multiplexed together (not shown). This set of operations repeats every set time period, which determines the frame rate of a FPA. For example, the higher the frame rate, the more quickly the FPA is able to move charge from a pixel to the unit cell, integrate the pixels outputs, and produce an enhanced image.

Each unit cell is provided (arranged) in a configuration of a matrix with m rows and n columns (i.e., m=n=8, 8×8 matrix). The approach reading out the detector array (i.e., accumulating the outputs of all the unit cells in the system) may be performed conventionally. Thus, in response to incident light on the detectors (i.e., detectors 407 of each unit cell), each row is accumulated by a row multiplexer (i.e., row MUX 1750) electric charge carriers as signal charge carriers. Also, in response to incident light on the detectors (i.e., detectors 407 of each unit cell), each column is accumulated by a column multiplexer (i.e., column MUX 1753) electric charge carriers as signal charge carriers.

A single cycle of focus/defocus may be used; however, by using many cycles of focus/defocus during a single frame time (i.e., the time between successive samples of the unit-cell's output data), it is possible to make the "effective" charge capacity very large. Therefore, with short integration times for each focus/defocus time slot, the integration capacitor need only be large enough to hold the worst case difference between the two focus modes.

FIG. 13 is a flow chart representing the first control method that may be executed by controller 1200. In step 310, the controller 1200 controls the focus/defocus mechanism 401 to focus. In step 320, the controller 1200 controls switch 1208 so that charge carriers flow to the fill side (i.e., using the fill input port) of the integration capacitor 1203 thereby accumulating (collecting) charge carries (i.e., charges the integration capacitor 1203) of the focused image onto the integration capacitor 1203. The controller 1200 controls the focus/defocus mechanism 401 to defocus in step 330. In step 340, the controller 1200 controls the switch 1208 so that charge carriers flow to the drain side (i.e., using the drain input port) of the integration capacitor 1203 thereby subtracting charge carries (i.e., discharges the integration capacitor 1203) from the integration capacitor 1203. In step 350, an optional step, the process of focus-defocus and accumulate-subtract (steps 310-340) is repeated a number of x times, where x may be any number (i.e., equal to or greater than 1, predetermined or fixed, or variable depending on the application, or determined based on setting the magnitude of the high frequency content). However, in this embodiment, a single cycle (steps 310, 320, 330, and 340) is sufficient (i.e., where x in step 350 is equal to zero). This process of focus-defocus and accumulate-subtract may also be repeated until the controller 1200 stops the operation that either by preset number desired by user instructions or by a predetermined setting calculated based on an algorithm. For example, an algorithm may calculate the gain ratio based on a plurality of previous determined frames or previously stored frames. After step 350 (or step 340), in step 360, the carriers are read out and a low-pass version of the image is provided. After the controller 1200 controls the switch in step 360, step 310 is preformed again.

FIG. 14 is a flow chart representing the second control method that may be executed by controller 1200. In step 311, the controller 1200 controls the focus/defocus mechanism 401 to defocus. In step 321, the controller 1200 controls the switch 1208 so that charge carriers flow to the drain side (i.e., using the drain input port) of the integration capacitor 1203 thereby subtracting charge carries (i.e., discharges the integration capacitor 1203) from the integration capacitor 1203. The controller 1200 controls the focus/defocus mechanism 401 to focus in step 331. In step 341, the controller 1200 controls switch 1208 so that charge carriers flow to the fill side (i.e., using the fill input port) of the integration capacitor 1203 thereby accumulating (collecting) charge carries (i.e., charges the integration capacitor 1203) of the focused image onto the integration capacitor 1203. In step 351, an optional step, the process of defocus-focus and subtract-accumulate (steps 311-341) is repeated a number of x times, where x may be any number (i.e., equal to or greater than 1, predetermined or fixed, or variable depending on the application, or determined based on setting the magnitude of the high frequency content). However, in this embodiment, a single cycle (steps 311, 321, 331, and 341) is sufficient (or where x in step 351 is equal to zero). This process of defocus-focus and subtract-accumulate may also be repeated until the controller 1200 stops the operation that either by preset number desired by user instructions or by a predetermined setting calculated based on an algorithm. For example, an algorithm may calculate the gain ratio based on a plurality of previous determined frames or previously stored frames. After step 351 (or step 341), in step 361, the carriers are read out and a low-pass version of the image is provided. After the controller 1200 controls the switch in step 361, step 311 is preformed again.

The integration times of accumulating and subtracting charge carriers to and from the integration capacitor 1203 may be fixed to have even integration times (of accumulating and subtracting) to essentially provide for even gain or to have more integration time of accumulating (than the subtracting time) to provide a greater gain for the focused image and a lesser gain for the defocused image.

However, the integration times may also be variable to provide for a change in gain, where at certain times the integration time of accumulating is greater than the integration time of subtracting and at other times the integration time of subtracting is greater than the integration time of accumulating. Further, the overall integrations times over a longer period of time have even integration times or approach having even integration times. Thus, even gain is not provided in a single cycle, but even gains may be provided over numerous cycles.

Referring to FIGS. 13 and 14, steps 350 and 351 may be omitted because a single integration cycle is sufficient where one integration cycle includes accumulating a charge (focus) and subtracting a charge (defocus). In another embodiment, steps 350 and 351 are performed in order for the process (Steps 310-340 and 311-341) to include more than one integration cycle. For example, x may be a predetermined number greater than 3. In a similar embodiment, the predetermined number can be preprogrammed or selected by a user before, during, or after (anytime) operation or may be calculated by an algorithm before, during, or after (anytime) operation.

Also, in FIG. 13, steps 310 and 320 do not have to be separate steps; steps 310 and 320 may be performed simultaneously. Steps 330 and 340 may also be performed simultaneously instead of being performed separately.

Further, in FIG. 14, steps 311 and 321 do not have to be separate steps; steps 311 and 321 may be performed simultaneously. Steps 331 and 341 may also be performed simultaneously instead of being performed separately.

Further, the number x (in reference to FIGS. 13 and 14) may be determined based on the scene content. For example, in low frequency conditions, it is desirable to have a ratio of high to low frequency content on the order of 2:1. In high frequency conditions, it is desirable to have a ratio of high to low frequency content on the order of 10:1 or approaching towards an order of 10:1 (i.e., between 9:1 and 10:1).

FIG. 15 is the graph of the charging and discharging of the integration capacitor 1203 as shown in FIG. 13 which is an example of the first implementation where the process begins with no charge on the integration capacitor 1203 and accumulates charge carriers onto the integration capacitor 1203.

FIG. 16 is the graph of the charging and discharging of the integration capacitor 1203 as shown in FIG. 14 which is an example of the second implementation where the process begins with a known charge on the integration capacitor 1203 and subtracts charge carriers from the integration capacitor 1203.

In FIGS. 15 and 16, the controller 1200 charges the integration capacitor 1203 while the image is focused (the charge is accumulated while in focus) and discharges the integration capacitor 1203 while the image is defocused (discharged while out of focus). The exact cycle times can be made variable depending on application. The ratio of these focused/defocused time periods determines the fraction of the high-frequency content emphasis. The final integrated value after all cycles are completed represents the desired fraction of high-frequency image content.

One idea of the present invention (i.e., FIG. 17) revolves around using an integration capacitor (i.e., integration capacitor 1203) that is charged during the focused beam time period and discharged during the defocused beam time period. The resulting voltage is the difference between the blurred and non-blurred beams. Because the integration capacitor only stores the difference between the two samples, the size of the capacitor can be dramatically reduced while still enjoying the benefits that a conventional system using a very large charge well would exhibit. By exactly subtracting the two quantities, the high spatial frequencies would be over emphasized to a degree that only noise would be visible. The desired approach is to have the defocused beam response to be slightly less. This approach can be accomplished by varying the size of the integration capacitor 1203 slightly during one of the samples (blurred or non-blurred), optically by attenuating the blurred beam slightly, or by integrating a slightly longer on the defocused portion of the cycle. Either way, this difference-voltage on the integration capacitor 1203 is the quantity that is read-out as the output of the FPA.

FIG. 17 is a circuit diagram showing one possible implementation of the invention. This figure includes input optics 40, a focus/defocus mechanism 401, a controller 1700, a unit cell 1777, a row multiplexor (MUX) 1750, a column bus 1751, an A/D converter 1752 (optional), and a column MUX 1753. The unit cell 1777 includes a detector 1407 (i.e., photovoltaic detector), an integration capacitor 1203, a buffer 1704, a first switch S1, a second switch S2, and an optional sample and hold capacitor 1713 with an optional switch S3. If used, the optional sample and hold capacitor 1713 is placed in a series connection in the wire connecting the nodal point between buffer 1704 and switch S1 to the Row MUX 1750, thereby being connected to the unit cell 1777 by connecting the nodal point between buffer 1704 and switch S1 to the input of the optional sample and hold capacitor 1713 (i.e., the switch side) and connecting the output of the optional sample and hold capacitor 1713 to the input of the Row MUX 1750.

FIG. 17 is a circuit diagram illustrating the attenuation factor in relation to the integration capacitor 1203. In FIG. 17, the attenuation (gain) factor α can be achieved within the current reversal circuit or by the varying the intensity of the beam during the blurred image collection time period. The operation of FIG. 17 is an example of a controller (i.e., FIG. 12 element 1200) controlling a switch (i.e., FIG. 12 element 1208) in order for an operation of accumulating and subtracting charge(s) (i.e., FIGS. 13 and 14) from an integration capacitor 1203.

In FIG. 17, the focus/defocus mechanism 401 shifts between focused and defocused modes while alternately "flipping" the polarity of the integration capacitor 1203 (switching which side of integration capacitor 1203 is fed with the charge carriers) so that during the focused time slot, the integration capacitor 1203 integrates "up" and during the defocused time slot, the integration capacitor 1203 integrates "down" resulting in the difference between the two time slots being stored on the integration capacitor 1203. The integration capacitor 1203 integrates "up" and "down" based on the position of the switches S1 and S2, where FIG. 17 currently illustrates the switches S1 and S2 in the integrate "up" position. The integration capacitor 1203 would integrate "down" based on reversing the position of switches S1 and S2.

Controller 1700 is similar to controller 1200; however, controller 1700 controls more than one switch (i.e., S1, S2, S3). For example, in relation to FIG. 13, the controller 1700 controls the focus/defocus mechanism 401 to focus in step 310. In step 320, the controller 1700 controls both switches S1 and S2 so that charge carriers (current) flow in the direction from the positive side of the integration capacitor 1203 to the negative side of the integration capacitor 1203 thereby the integration capacitor 1203 integrates "up" during the focused time slot. The controller 1700 controls the focus/defocus mechanism 401 to defocus in step 330. In step 340, the controller 1700 controls both switches S1 and S2 so that charge carriers flow in the direction from the negative side of the integration capacitor 1203 to the positive side of the integration capacitor 1203 (current reversal) thereby the integration capacitor 1203 integrates "down" during the defocused time slot. In step 350, again an optional step, the process of steps 310-340 is repeated a number of x times, where x may be any number (i.e., equal to or greater than 1, predetermined or fixed, or variable depending on the application, or determined based on setting the magnitude of the high frequency content). However, in this embodiment, a single cycle (steps 310, 320, 330, and 340) is sufficient (i.e., where x in step 350 is equal to zero). This process may also be repeated until the controller 1700 stops the operation that either by preset number desired by user instructions or by a predetermined setting calculated based on an algorithm. For example, an algorithm may calculate the gain ratio based on a plurality of previous determined frames or previously stored frames. After step 350 (or step 340), in step 360, the carriers are read out and a low-pass version of the image is provided. After a single cycle of steps 310, 320, 330, and 340 is performed, the integration capacitor 1203 has stored a differences which resulted between the two time slots (focused and defocused time slots). After the controller 1700 controls the switch in step 360, step 310 is preformed again.

Also, in relation to FIG. 14, the controller 1700 controls the focus/defocus mechanism 401 to defocus in step 311. In step 321, the controller 1700 controls both switches S1 and S2 so that charge carriers (current) flow in the direction from the negative side of the integration capacitor 1203 to the positive side of the integration capacitor 1203 thereby the integration capacitor 1203 integrates "down" during the defocused time slot. The controller 1700 controls the focus/defocus mechanism 401 to focus in step 331. In step 341, the controller 1700 controls both switches S1 and S2 so that charge carriers flow in the direction from the positive side of the integration capacitor 1203 to the negative side of the integration capacitor 1203 (current reversal) thereby the integration capacitor 1203 integrates "up" during the focused time slot. In step 351, again an optional step, the process of steps 311-341 is repeated a number of x times, where x may be any number (i.e., equal to or greater than 1, predetermined or fixed, or variable depending on the application, or determined based on setting the magnitude of the high frequency content). However, in this embodiment, a single cycle (steps 311, 321, 331, and 341) is sufficient (i.e., where x in step 351 is equal to zero). This process may also be repeated until the controller 1700 stops the operation that either by preset number desired by user instructions or by a predetermined setting calculated based on an algorithm. For example, an algorithm may calculate the gain ratio based on a plurality of previous determined frames or previously stored frames. After step 351 (or step 341), in step 361, the carriers are read out and a low-pass version of the image is provided. After a single cycle of steps 311, 321, 331, and 341 is performed, the integration capacitor 1203 has stored a differences which resulted between the two time slots (focused and defocused time slots). After the controller 1700 controls the switch in step 361, step 311 is preformed again.

The duty cycle of a focus/defocus mechanism determines the ratio of focused to defocused signal gain factor (($\alpha$) in the present invention. The duty cycle of the present invention describes the cycle of changing or cycling between, focusing and defocusing, charging and discharging a capacitor, integrating the capacitor "up" and "down", a focused unit cell and a defocused unit cell, etc. Thus, the duty cycle relates to the controller (i.e., 1200, 1700) controlling the focusing and defocusing of the focus/defocus mechanism 401, or the charging and discharging the integration capacitor 1203, the controller 1700 controlling the switches S1 and S2 to integrating the integration capacitor 1203 "up" and "down", etc. The present invention may have a 50% duty cycle to provide equal gain, for example, accumulating charges on the integration capacitor 1203 for half the time and subtracting charges from the integration capacitor 1203 the other half of the time or charge half the time and discharge half the time (i.e., FIGS. 15 and 16). However, the present invention is not limited to a 50% duty cycle where a change in duty cycle would provide a change in gain. Further, the controllers of the present invention (i.e., 1200, 1700) may control the duty cycle associated with each system.

The duty cycle according to aspects of the present invention may be adjusted based on scene content measured by a contrast measuring device (not shown). In aspects of the present invention, the present invention may also include a feed-forward image contrast measuring unit (not shown) where the output of the detector 407 is feed to the feed-forward image contrast measuring unit. The feed-forward image contrast measuring unit generates an image contrast measure by first computing the difference between adjacent pixels values along each row of the input image. The contrast measure is then derived by summing all of the difference values. For example, an all white or an all black input image (i.e., an input image containing almost exclusively low frequency components) will yield a very low contrast measure. Note, there is always some noise content (typically high frequency noise). However, an input image that reflects a checkerboard pattern, wherein every other pixel is alternately black and white (i.e., an input image containing a large high frequency content) will result in a very large contrast measure.

The controllers of the present invention may also change the duty cycle from a 50% duty cycle to a duty cycle that is greater in the focusing time than the defocusing time (i.e., 51% duty cycle for focusing and 49% duty cycle for defocusing) to provide a greater gain for the focused image and a lesser gain for the defocused image.

The ratio of the focused to defocused signal ($\alpha$) is controlled by simply varying the ratio of the integration times between the two time slots. This difference is optionally sampled onto an (optional) sample/hold capacitor 1713 (so that all unit cells (where a similar or equivalent unit cell 1777 is provided for each input (i.e., 8 inputs) of a column bus 1751) can operate in "snap-shot" mode wherein they all integrate the scene at the same instant) or conducted directly the row multiplexer 1750 and a column bus 1751. At this point, an optional A/D conversion can be done by an A/D converter 1752 on each column bus or the analog sample can be switched through a column multiplexer 1753 for output to an external A/D converter (not shown).

The same configuration, as shown in FIG. 17, in relation to the row MUX 1750, the column bus 1751, the A/D converter 1752 (optional), and the column MUX 1753, is applicable to FIG. 12 (and FIGS. 19 and 21-22—discussed below). Besides the optional A/D converter 1752, FIG. 17 (and FIGS. 12, 19, and 21-22) may also use up to eight A/D converters per column (as many as eight rows converted at a time). There are also in-unit-cell A/D conversion approaches, high-speed A/D converters at the edge of the ROIC, and analog outputs to a conventional warm A/D converter in use in the present invention.

In the unit cell 1777 of FIG. 17, an incident photon creates a charge in a pixel in the detector 407. This charge is integrated in the integration capacitor 1203 over a set period of time (as shown in FIGS. 15 and 16) when the controller 1700 has switched switches S1 and S2 to a position during non-blurred imaging which is occurring during the period of charging. The switches S1 and S2 are switched by the controller 1700 to the position during blurred imaging which is occurring during the period of discharging. During discharging, the carriers from the detector 407 are applied to an attenuation factor, thus, providing a current reversal. The controller 1700 switches the switches S1 and S2 again to begin integrating charge from the pixel again.

Figure 18:
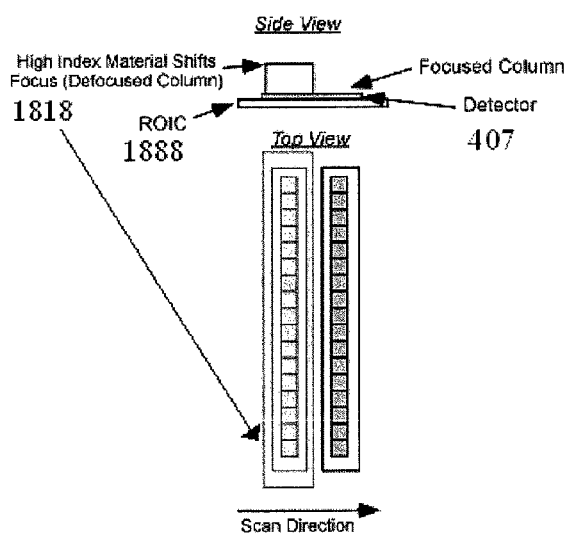
FIG. 18 is one example illustrating using a scanning FPA according to aspects of the invention.

FIG. 18 is an embodiment illustrating one example of how this invention could be used for scanning FPAs. In this example two columns of detectors (or multiple columns in two separate banks wherein the columns are combined with a Time-Delay-Integration approach) have the same image scanned across them except one of the columns has a high index material 1818 that results in a defocused version of the image on that column. The difference between these two columns thus contains mainly the high-frequency content of the image.

In FIG. 18, a high index material 1818 may be located between detector 407 and the input optics 40 or the focus/defocus mechanism 401. More specifically the high index material 1818 may be located between each of the detector 407 of a defocused column and the input optics 40 or the focus/defocus mechanism 401.

High index material has a higher index of refraction, where "index of refraction" refers to the speed of that light (or other waves) travels as it passes through the material or refers to the measure of how much the speed of light is reduced inside the medium (high index material 1818). Thus, by locating the high index material 1818 between detector 407 and the input optics 40 or the focus/defocus mechanism 401, there is a change in the effective path length according to the index of refraction associated with the high index material 1888.

The high index material may be materials like glass and/or plastics. The high index material may also be lens(es) or plate(s) that are constructed of plastic(s) and/or glass. Further, another method of providing a higher index of refraction to the defocused column detectors may be to apply a transparent high refractive index coating to the lens(es), focus/defocus mechanism 401, and/or the detector(s) 407.

Figure 19:
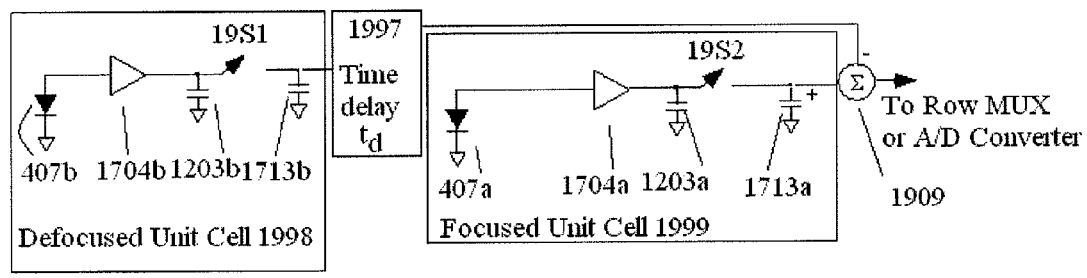
FIG. 19 is a circuit diagram showing an embodiment of another possible implementation of the invention.

FIG. 19 is an embodiment illustrating one example of how a scanning FPA signal processing might be accomplished, where a time delay 1997 must be used between the defocused and focused columns so that the results from the two columns are from exactly the same point on the image. This delay may be performed in an analog method by a hold capacitor(s). This delay may also be performed digitally by converting the analog output of the defocused unit cell 1998 to digital using an A/D converter and delaying the result with a digital memory and then converting the delayed digital result back to analog by a D/A converter before supplied the delayed analog result to the summation node 1909. In this case, the integration capacitors 1203a and 1203b in each unit cell are preferably able to accommodate the entire detector current as a direct subtraction within a single unit cell where the time delay is accounted for. This approach provides the advantage of reducing the required dynamic range of the output data and providing only the high-frequency component of the imagery.

The system of FIG. 19 includes a defocused cell 1998, a time delay 1997, a focused cell 1999, and a summation node 1909 (i.e., adder, summer). The defocused cell 1998 of FIG. 19 includes a detector 407b, a buffer 1704b, an integration capacitor 1203b, switch 19S1, and a sample and hold capacitor 1713b. The focused cell 1999 of FIG. 19 includes a detector 407a, a buffer 1704a, an integration capacitor 1203a, switch 19S2, and a sample and hold capacitor 1713a. The switch 19S1 and the sample and hold capacitor 1713b of the defocused cell 1998 and the switch 19S2 and the sample and hold capacitor 1713a of the focused cell 1999 are optional. Further, the output of the summation node 1909 is provided to a row MUX (i.e. 1750) or an A/D converter as discussed above in reference to FIG. 17.

Figure 20:
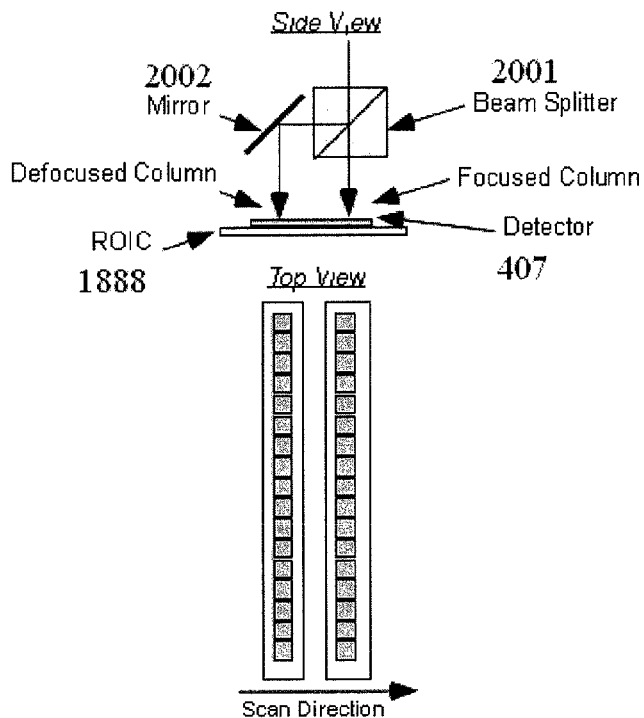
FIG. 20 illustrates another embodiment of a focus/defocus mechanism according to aspects of the invention.

FIG. 20 is an embodiment illustrating one alternative scanning approach where a beam-splitter 2001 and a mirror 2002 are used to sample the exact same point on the image onto two separate detector columns. For one of the columns, the optical path length is sufficiently different enough to provide a defocused image for the left column while the right column is left focused. One advantage of this approach is that no time delay is required before subtracting the two samples from each other and an effective large charge capacity can again be realized. Another advantage of this approach is that it may provide a completely passive system for charging and discharging the integration capacitor.

Figure 21:
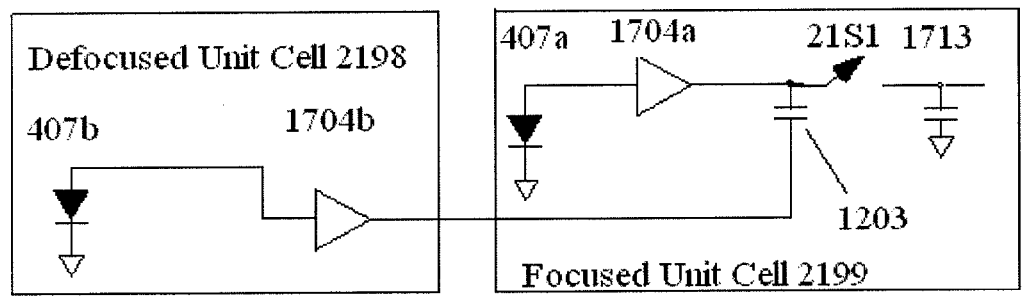
FIG. 21 is a diagram showing further details of the embodiment according to FIG. 20.

FIG. 21 illustrates one possible unit cell concept for this alternative scanning approach. The system of FIG. 21 includes a defocused unit cell and a focused unit cell. The defocused unit cell includes a detector 407b and a (optional) buffer 1704b. The focused unit cell includes a detector 407a, a (optional) buffer 1704a, an integration capacitor 1203, a switch 21S1, and a sample and hold capacitor 1713. The switch 21S1 and the sample and hold capacitor 1713 are optional. The output of focus side of the capacitor (i.e., nodal point between the buffer 1704a and the capacitor 1203) or the output of the focused unit cell is provided to a row MUX or an A/D converter as discussed above in reference to FIG. 17.

The resultant detector current from the defocused unit cell 2198 flows into the bottom of the integration capacitor 1203 while the focused unit cell's detector current flows into the top of the integration capacitor forming a simple (no alternate switching required in real time) difference between the two quantities. This approach provides the full enhancement of this invention wherein the high frequency content of the image is delivered to the output and a small integration capacitor can be used to provide a large "effective" charge capacity. A non-unity ratio of the focused/defocused signals can be accomplished by adding switches (i.e., 21S1) to vary the integration time between the two signal sources as in the staring case or by varying the materials in the beam-splitter arrangement so that the flux is not evenly split between the two columns.

Figure 22:
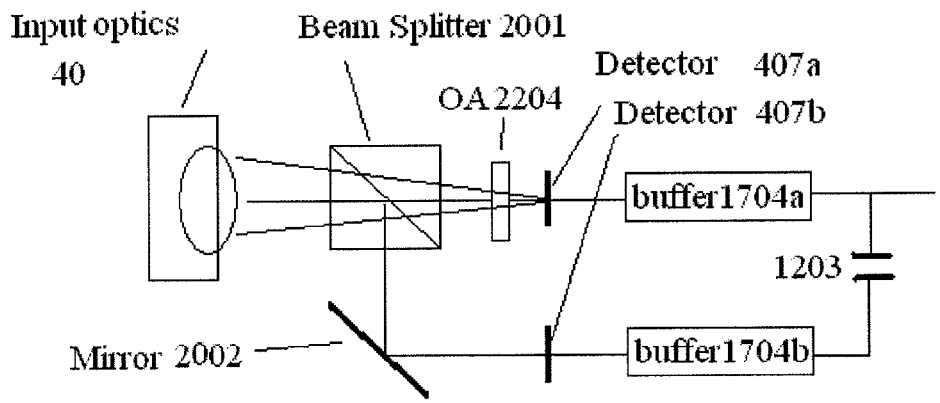
FIG. 22 is a diagram showing other details of the embodiment according to FIGS. 20 and 21.

FIG. 22 illustrates a block diagram of the example of the alternative scanning approach according to FIGS. 20 and 21. The system of FIG. 22 includes an input optics 40, a beam-splitter 2001, a mirror 2002, an optional optical attenuator (OA) 2204, detectors 407a and 407b, (optional) buffers 1704a and 1704b, and an integration capacitor 1203. FIG. 22 may also include a switch and a sample and hold capacitor (not shown in FIG. 22) as discussed above in reference to FIG. 21 (i.e., 21S1, 1713).

The optical attenuator may be used to attenuate an intensity or power level of an input optical beam in a controlled manner to produce an output optical beam with different attenuated intensities. The input optics 40 focuses a beam onto the beam splitter 2001.

The beam splitter 2001 is an optical device that splits a beam of light into two beams of light. Thus, the beam splitter 2001 may be a cube or prism comprising two triangular prisms made of glass, plastic, or the like, where a portion (i.e., half) of the light incident through the face of the cube (one side) is reflected while the remaining portion (i.e., other half) is transmitted through another (adjacent) side of the cube. The beam splitter may be a polarizing beam splitter, such as the Wollaston prism, a dichroic mirrored prism, a simple dielectric, or any conventional beam splitter. However, the beam splitter 2001 is not limited to a beam splitter device as discussed above, the beam splitter 2001 may be any device that may divide or split the beam where half of the beam is reflected and the other half is transmitted.

The mirror 2002 provides a defocused image to the detector 407b by because the effective path length from the input optics 40 to the detector 407b is different (i.e., greater than) the effective path length from the input optics 40 to the detector 407a. Because the mirror 2002 can create noise in the defocused unit cell, the defocused unit cell may have a different strength than the focused unit cell and the optical attenuator may be used to control the relative strength.

The mirror 2002 in FIGS. 20 and 22 is used to provide the system an effective path length from the input optics 40 to the detector 407a that is different than the effective path length from the input optics 40 to the detector 407b, which the detectors 407a and 407b may be on the same focal plane. However, the mirror 2002 is optional where the detectors 407a and 407b are provided on different focal planes. This way, the detectors provide different effective path lengths (focused and defocused images) by the detectors 407a and 407b being located at different lengths from the point of division of the light beam split by the beam splitter 2001.

The present invention is not limited to the above embodiments and various changes and modifications can be made within the spirit and scope of the present invention. It is to be understood that the present invention is capable of use in various other combinations and environments and is capable of changes or modifications within the scope of the inventive concept as expressed herein. Such variations are not to be regarded as departure from the spirit and scope of the invention, and all such modifications as would be obvious to one skilled in the art are intended to be included within the scope of the following claims.

What is claimed is:

1. An imaging circuit, comprising:
an image detector;
accumulator coupled to the image detector;
a focus/defocus mechanism focusing and defocusing an optical image onto the image detector; and
a controller operatively connected to the focus/defocus mechanism, wherein the controller controls the focus/defocus mechanism to focus and defocus the optical image onto the image detector to provide focused and defocused images; wherein
the controller controls the focus/defocus mechanism to focus the optical image onto the image detector to provide charge carriers of the focused image onto the accumulator, where the accumulator accumulates the charge carriers of the focused image,
the controller controls the focus/defocus mechanism to defocus the optical image onto the image detector to provide charge carriers of the defocused image onto the accumulator, where the accumulator subtracts the charge carriers of the defocused image, and
the imaging circuit reads out the charge carriers from the accumulator representative of a low pass filtered version of the focused image.

2. The imaging circuit according to claim 1, further comprises:
an input optics optically coupled to the focus/defocus mechanism, wherein the input optics gathers the optical image and relays the optical image to the focus/defocus mechanism.

3. The imaging circuit according to claim 1, further comprising:
a switch is coupled between the image detector and the accumulator, wherein
the controller controls the switch to accumulate the charge carriers of the focused image on the accumulator by using a fill port of the accumulator, and
the controller controls the switch to subtract the charge carriers of the defocused image from the accumulator by using a drain port of the accumulator.

4. The imaging circuit according to claim 1, wherein the controller controls the focus/defocus mechanism to successively focus and defocus the optical image onto the image detector to provide focused and defocused images.

5. The imaging circuit according to claim 1, wherein the accumulator is an integration capacitor located within a sensor readout integrated circuit.

6. The imaging circuit according to claim 5, further comprising:
a switch is coupled between the image detector and the integration capacitor, wherein
the controller controls the switch to accumulate the charge carriers of the focused image on the integration capacitor by using a fill port of the integration capacitor, and
the controller controls the switch to subtract the charge carriers of the defocused image from the integration capacitor by using a drain port of the integration capacitor.

7. The imaging circuit according to claim 1, wherein the focus/defocus mechanism comprises:
a lens; and
an aperture stop device that restricts the amount of light entering the lens;
wherein the controller controls the aperture stop device by restricting and unrestricting an aperture of the aperture stop device to restrict/unrestrict the diameter of the light that can enter the lens.

8. The imaging circuit according to claim 7, wherein the aperture stop device is an LCD device and the LCD device provides an outer annular shape preventing light from passing though the LCD device to restrict light entering the lens.

9. The imaging circuit according to claim 8, wherein the LCD device provides an inner annular shape located inward of the outer annular shape that allows light to pass through to the lens.

10. The imaging circuit according to claim 8, wherein the LCD device adjusts the aperture by adjusting the diameter of the outer annular shape to adjust an amount of light that is restricted to enter through the lens.

11. The imaging circuit according to claim 1, wherein the focus/defocus mechanism comprises:
a lens; and
an electro mechanical actuator coupled to said lens;
wherein the controller controls the lens position along an axis of incident light by applying an electrical signal to the electro mechanical actuator thereby moving the lens.

12. The imaging circuit according to claim 11, wherein the electro mechanical actuator is a piezoelectric actuator.

13. The imaging circuit according to claim 11, wherein the electro mechanical actuator is a stepper motor.

14. The imaging circuit according to claim 1, wherein
the image detector is connected to an electro mechanical actuator, and
the controller controls the image detector position along an axis of incident light by applying an electrical signal to the electro mechanical actuator thereby moving the image detector.

15. The imaging circuit according to claim 14, wherein the electro mechanical actuator is a piezoelectric actuator.

16. The imaging circuit according to claim 14, wherein the electro mechanical actuator is a stepper motor.

17. The imaging circuit according to claim 1, wherein
the image detector is connected to a first electro mechanical actuator,
the controller controls the image detector position along an axis of incident light by applying an electrical signal to the first electro mechanical actuator thereby moving the image detector, and
wherein the focus/defocus mechanism comprises:
a lens; and
a second electro mechanical actuator coupled to said lens;
wherein the controller controls the lens position along the axis of incident light by applying an electrical signal to the second electro mechanical actuator thereby moving the lens.

18. An imaging method, comprising the steps of:
controlling a focus/defocus mechanism to provide a focused image on a image sensor;
accumulating charge carriers on an accumulator of a read-out circuit, the accumulated charge carriers being representative of the focused image;
controlling the focus/defocus mechanism to provide a defocused image on a image sensor;
subtracting charge carriers from the accumulator, the subtracted charge carriers being representative of the defocused image; and
reading out the charge carriers from the accumulator representative of a low pass filtered version of the focused image.

19. The imaging method according to claim 18, wherein the steps of:
controlling a focus/defocus mechanism to provide a focused image on a image sensor; accumulating charge carriers on an accumulator of a readout circuit, the accumulated charge carriers being representative of the focused image; controlling the focus/defocus mechanism to provide a defocused image on a image sensor; subtracting charge carriers from the accumulator, the subtracted charge carriers being representative of the defocused image; and reading out the charge carriers from the accumulator representative of a low pass filtered version of the focused image; are repeated a predetermined number of times.

20. An imaging circuit, comprising:
a capacitor;
a first detector coupled to a first side of the capacitor;
a second detector coupled to a second side of the capacitor; and
a beam splitter splitting a light beam into a first light beam and a second light beam, where the first light beam is relayed to the first detector and the second light beam is relayed to the second detector, wherein
the effective path length from the beam splitter to the first detector is different than the effective path length from the beam splitter to the second detector,
the first detector provides charge carriers of a focused image onto the first side of the capacitor and the second detector provides charge carriers of a defocused image onto the second side of the capacitor, and
the imaging circuit reads out the charge carriers from the capacitor representative of a low pass filtered version of the focused image.

21. The imaging circuit according to claim 20, further comprising:
an input optics optically coupled to the beam splitter, wherein the input optics gathers the optical image and relays the optical image to the beam splitter.

22. The imaging circuit according to claim 20, further comprising:
a mirror which relays the second light beam from the beam splitter to the second detector.

23. The imaging circuit according to claim 1, wherein the image detector is either a quantum or thermal detector.

* * * * *